United States Patent [19]

Taylor, Jr. et al.

[11] Patent Number: 4,971,753
[45] Date of Patent: Nov. 20, 1990

[54] NUCLEAR FUEL ELEMENT, AND METHOD OF FORMING SAME

[75] Inventors: Ira N. Taylor, Jr., Livermore; Patrick M. Magee, Los Gatos, both of Calif.

[73] Assignee: General Electric Company, San Jose, Calif.

[21] Appl. No.: 370,952

[22] Filed: Jun. 23, 1989

[51] Int. Cl.$^5$ .............................................. G21C 3/00
[52] U.S. Cl. .................... 376/417; 376/416; 376/422
[58] Field of Search ...................... 376/416, 417, 422

[56] References Cited

U.S. PATENT DOCUMENTS

| | | | |
|---|---|---|---|
| 4,022,662 | 5/1977 | Gordon et al. | 176/82 |
| 4,029,545 | 6/1977 | Gordon et al. | 176/68 |
| 4,045,288 | 8/1977 | Armjio | 176/82 |
| 4,200,492 | 4/1980 | Armijo et al. | 176/82 |
| 4,372,817 | 2/1983 | Armijo et al. | 376/417 |

FOREIGN PATENT DOCUMENTS

| | | |
|---|---|---|
| 1198231 | 12/1985 | Canada. |
| 0134189 | 11/1978 | Japan. |
| 933500 | 8/1963 | United Kingdom. |

Primary Examiner—Stephen J. Lechert, Jr.
Assistant Examiner—Nina Bhat
Attorney, Agent, or Firm—Robert R. Schroeder

[57] ABSTRACT

A method of inhibiting deleterious reactions between metallic fissionable fuel for nuclear reactors and stainless steel containers for housing such fuel comprising imposing an expendable body of alloying metal intermediate the fuel and container is disclosed. The disclosure also includes an improved nuclear fuel element comprising metal alloy fuel housed within stainless steel containers having a body of zirconium metal interposed between the fuel and containers.

16 Claims, 2 Drawing Sheets

NUCLEAR FUEL ELEMENT, AND METHOD OF FORMING SAME

FIELD OF THE INVENTION

This invention relates to fuel elements containing fissionable fuel material for use in nuclear reactors. The invention is specifically directed to an improvement in nuclear reactor fuel elements containing fissionable fuel in metallic form and alloys of mixtures of metals which are housed within stainless steel containers.

BACKGROUND OF THE INVENTIONS

Fissionable nuclear fuel for nuclear reactors typically comprises one of two principal chemical forms. One type consists of ceramic or non-metallic oxides of fissionable and/or fertile element(s) such as uranium, plutonium or thorium, and mixtures thereof. This category of ceramic or oxide fuels are disclosed, for example, in U.S. Letters Pat. Nos. 4,200,492, issued Apr. 29, 1980, and 4,372,817, issued Feb. 8, 1983. Among certain distinctive aspects and advantages of ceramic fuels is their relatively high melting temperatures and low level of reactivity with other materials even at high temperatures and pressures encountered in nuclear reactors. Ceramic fuels commonly comprising uranium dioxide are most frequently used in contemporary commercial electrical power generating, water cooled and moderated nuclear reactors. The very high melting characteristics and low level of reactivity of these oxide fuels enables the reactor to be operated at higher temperature and in turn pressure conditions for increased efficiency and economy. Typical oxide forms of fuel such as uranium dioxide have melting temperatures of approximately 5000 degrees F. (2760 degrees C).

Ceramic or non-metallic fuels however suffer from low thermal conductivity and lower fissionable atoms per unit volume, among other shortcomings.

The other principal type of nuclear reactor fuel comprises fissionable elements such as uranium, plutonium and thorium, and mixtures thereof, in metallic, non-oxide form. Specifically this category comprises uranium, plutonium, etc. metal and mixtures of such metals, namely alloys of such metals. Fissionable fuel materials in metal form have a long history in the nuclear reactor field, but due to significant shortcomings have currently been used primarily in the so-called breeder type of reactors utilizing liquid metal coolants.

The primary handicaps in the use of metallic fissionable material as fuel are their relatively low melting temperatures and accompanying loss of structural characteristics such as tensile strength at moderately low temperatures, and high degree of reactively with other elements including susceptibility to corrosion. For example uranium, the most prevalent fissionable fuel material, as a metal melts at only 2070 degrees F. (1132 degrees C.), and an alloyed metal fuel containing uranium and plutonium normally have even lower melting temperatures, such as about 1130 degrees F (610 degrees C.) for an 88 weight percent uranium and 12 weight percent plutonium alloy.

Fissionable fuels in metal form, on the other hand, provide excellent thermal conductivity for highly efficient heat transfer, and maximum concentration of fissionable atoms per unit volume, among other attributes. Thus, more power can be produced per unit size with metallic fuel, and more efficiently conveyed to the heat carrying coolant.

Alloying mixtures of uranium metal and/or plutonium metal have been proposed and used to enhance metal fuels and overcome such shortcomings. For example, small amounts of alloying metals such as molybdenum, niobium, titanium, zirconium, or chromium, have been used to stabilize phase structures and in turn the properties attributable thereto in metallic fuels.

For instance, the article "Properties Of Uranium-Plutonium-Base Metallic Alloys" by R. J. Dunworth et. al., *Argonne National Laboratory, Annual Progress Report For* 1965, ANL-7155, 1965, pages 14–25, discloses the alloying of metal fuel with zirconium or titanium to increase the melting temperature of uranium-plutonium fuel. Such alloyed fuel compositions, specifically those comprising a major portion of uranium metal with minor portions of plutonium and zirconium metals have been the subject of extensive consideration as evidenced in an article entitled "Performance Of Advanced U-Pu-Zr Alloy Fuel Elements Under Fast-Reactor Conditions" by W. N. Beck et. al., *Argonne National Laboratory*, Trans. Ans., 10, 1967, page 106 and 107. Zirconium is also included as an alloying component in such metallic fuels to provide an elevated solidus temperature for the fuel and to enhance its chemical compatibility with stainless steel which is commonly employed in fuel containers for service in liquid metal cooled nuclear reactors.

However, subsequent studies have identified additional problems which are not adequately resolved by alloying mixtures of such conventional fissionable metal fuels with non-fuel elements such as zirconium metal. It has been found that evidently due to inherent reactor conditions of intense radiation and high temperatures, metal alloy fuels, which initially are provided in a substantially uniform mixture of the alloyed ingredients, become chemically redistributed into nonuniform mixtures of the alloyed components. This restructuring phenomena in the metal alloyed fuel has a pronounced effect upon its properties and their distribution throughout the mass of the fuel body.

One significant aspect of this chemical redistribution of the alloyed ingredients such as zirconium, is the inward migration of the zirconium metal to the inner or central area of the body of fuel with an accompanying increase in the solidus temperature of the inner or central area and correspondingly a reduced solidus temperature in the outer or peripheral area of the unit. Thus, &he melting conditions of the remaining alloying ingredients, such as uranium and/or plutonium, in the peripheral area of the fuel body are lowered, and the effect of the added zirconium to avoid low melting phase formation is reduced or negated. A lower melting condition of the surface portions of fuel units increase the potential for chemical interaction with adjoining materials.

This redistribution phenomenon in metal alloyed fuel whereby zirconium as an ingredient migrates inward away from the peripheral area of the body of fuel results in the remaining alloy ingredients forming lower melting alloys or eutectic compositions. Moreover, components remaining in the peripheral area of the fuel such as plutonium and fission produced cerium, deprived of zirconium, result in low melting ingredients which can attack the stainless steel of the fuel container, and/or react with components of the stainless steel alloy such as iron and thereby diminish the integrity of the container. An interreaction between fuel components and the stainless steel container housing the fuel, or its ingredients such as iron, will detract from the structural strength of, the containers relatively thin walls, due to reduced thickness, altered composition or resulting permeability.

For instance a paper entitled "Chemical Interaction Of Metallic Fuel With Austenitic And Ferritic Stainless Cladding", by G. L. Hofman et al, *Argonne National Laboratory*, Tucson Conference, September 1986, discusses an interdiffusion phenomenon between metallic fuel comprising uranium/plutonium/zirconium and components of ferritic stainless steel fuel containers. It is noted that the phenomenon could have an adverse effect upon the performance of such a fuel composition housed within the conventional stainless steel containers. The potential of this phenomena comprises formation of strength reducing diffusion zones within stainless steel, intergranular penetration of fuel ingredients into stainless steel, and the formation of eutectic areas with low melting levels below that of operating temperatures.

The nonuniform melting conditions of metal alloy fuels in reactor service and the potential effect is a subject of an article "Postirradiation Examination Of U-Pu-Zr Fuel Elements Irradiated In EBR-11 To 4.5 Atomic Percent Burnup", by W. F. Murphy, et. al., *Argonne National Laboratory*, ANL-7602, November 1969. This article additionally discusses the extensive physical changes which occur in metal alloy fuel during fission such as its extensive deformation including expansion or swelling of up to about 30 percent by volume, including thermal expansion and expansion due to internal generation of fission produced gases.

Due to this extensive degree of swelling of metallic fuel during fission in reactor service, the body of fuel material, typically in the form of long thin rods and sometimes referred to as slugs, is provided with a cross-sectional dimension substantially less than the internal cross-sectional area of the container housing the fuel to accommodate the increased volume of the resulting irradiation gas bloated body of fuel.

Additionally, the potential for causing a failure of stainless steel containers housing metal alloy fuel is reviewed in a brief article entitled "Metallic Fuel Cladding Eutectic Formations During Postirradiation Heating" by B. R. Seidel, *Argonne National Laboratory*, Trans. Ans. 34, June 1980, pages 210 and 211.

SUMMARY OF THE INVENTION

This invention comprises a method of inhibiting an interaction between a metal alloy fissionable fuel for a nuclear reactor and a stainless steel container for the fuel by compensating for the chemical redistribution of beneficial alloying ingredients in the metal alloy fuel, and the enhanced nuclear fuel element of the method. The method of inhibiting such interaction includes countering the irradiation induced phenomenon of chemical redistribution in the alloy fuel and improving fuel elements containing same, comprises providing a fuel element having a body of alloyed uranium metal fuel housed within a stainless steel container with an expendable source of alloying metal which raises the melting temperature of the metallic fuel, such as the component subject to redistribution. The invention also includes an improved nuclear fuel element containing an expendable source or body of such an alloying metal, including the alloyed fuel component which exhibits a propensity for its chemical redistribution within the unit of metal alloy fuel.

OBJECTS OF THE INVENTION

It is a primary object of this invention to provide a means for inhibiting an interaction between a metal alloy fissionable fuel for a nuclear reactor and a stainless steel container housing the fuel.

It is also an object of this invention to provide a method of compensating for the chemical redistribution of beneficial alloying ingredients in metal alloy fissionable fuel for service in nuclear reactors.

It is an additional object of this invention to provide an improved fuel element for nuclear reactors comprising a metal alloy fissionable fuel housed within a stainless steel container that inhibits interaction between components of the metal alloy fuel and stainless steel container.

It is a further object of this invention to provide a means of impeding the formation of low temperature melting eutectic compositions from components of a metal alloy fissionable fuel and/or stainless steel with a fuel element comprising same.

It is a still further object of this invention to provide a method, and product thereof, for introducing an expendable source of an alloying component that raises the melting temperature of restructured alloys or eutectic compositions within a fuel element of a metal alloy fuel housed in a stainless steel container.

DETAILED DESCRIPTION OF THE INVENTION

Figure 1:
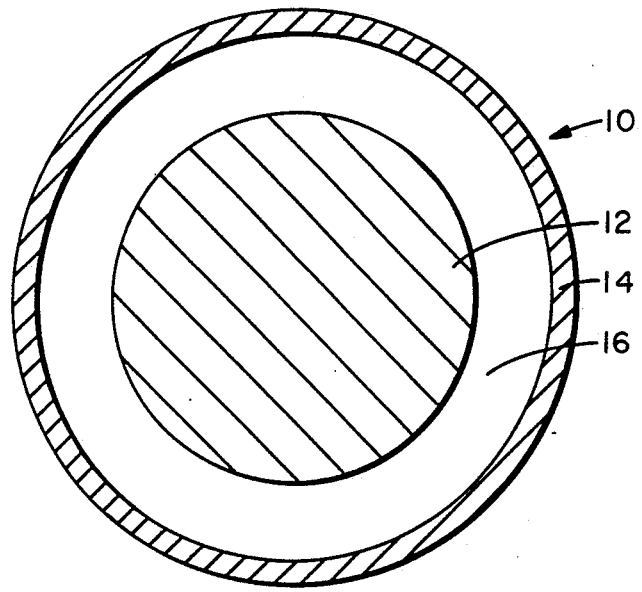
FIG. 1 of the drawings is an enlarged cross-sectional view of a nuclear fuel element showing the prior art design.

Referring to the drawing, FIG. 1 illustrates a typical fuel element 10 in cross-section. Fuel element 10 comprises an elongated body(s) of fuel 12, such as a rod sometimes referred to as a pin or slug, containing a fissionable material in the form of metal, or a mixture of metals or alloy. Typical fissionable fuels in metal form comprise uranium, plutonium and thorium, which can be employed alone or alloyed. Most commonly such fuels primarily comprise uranium metal, and currently a preferred fuel comprises combinations of a major portion of uranium alloyed with a minor portion of plutonium, for example about 60 to about 98 percent weight uranium metal with about 2 to about 40 percent weight plutonium metal. A preferred metal fuel alloy under consideration for commercial service comprises an alloyed composition of about 64 weight percent of uranium metal, about 26 weight percent of plutonium metal and about 10 weight percent of zirconium. Such an alloy has a melting point of about 1868 degrees F. (1020 degrees C.).

The elongated body of metallic fuel 12, or several sections of fuel bodies or rods, is housed within a sealed, tube-like metal container 14, sometimes referred to as a "fuel cladding". Sealed container 14 isolates the fuel body 12 from the coolant which flows over the exterior surface of the fuel element 10 to transfer heat away therefrom, protecting the fuel from reaction with or contamination from the coolant. Moreover the container seals in fission products and precludes their escape out into the coolant.

Typical liquid metal cooled nuclear reactors, such as the system disclosed in U.S. Letters Pat. No. 4,508,677, issued Apr. 2, 1985, conventionally use stainless steel for their metal fuel containers. Stainless steel alloys comprising those marketed under the commercial designations HT9 or D9 are currently the preferred compositions for the service. Typical alloy compositions for these stainless steel are shown in the following Table I.

TABLE 1

| STAINLESS STEEL CONTAINER ALLOY COMPOSITIONS | | |
|---|---|---|
| INGREDIENT - Weight Percent | HT9 | D9 |
| Fe | 84.8 | 65.7 |
| Cr | 12.0 | 14.5 |
| Ni | 0.6 | 14.5 |
| Mo | 1.0 | 2.0 |
| Mn | 0.5 | 2.0 |
| W | 0.4 | — |
| V | 0.3 | — |
| Si | 0.2 | 1.0 |
| Ti | — | 0.3 |
| C | 0.2 | 0.03 |
| N | 0.004 | 0.005 |
| O | 0.006 | 0.006 |

The metal fuel body(s) 12 is designed in configurational dimensions for radial expansion of about 25 to 30 percent in volume due primarily to internally generated, fission produced gases. Thus, the initially produced metal fuel units are of substantially smaller cross-sectional diameter than the internal cross-sectional area within the fuel container 14. This difference in cross-sectional dimensions between the metal fuel body 12 initially and the fuel container 14 leaves an intermediate between the exterior surface of the fuel body 12 and the interior surface of the fuel container 14. This initial intermediate space 16 is designed to accommodate the extensive expansion of the fuel units 12 attributable to the gases produced during service and protect the fuel container 14 from physical stress and possible rupture due to internal pressure from a confined body of expanding fuel.

The void space 16 of the fuel element 10 is initially filled during assembly with sodium metal, which is molten at normal reactor operating temperatures and becomes displaced by the fuel as it expands. The sodium is employed to enhance heat transfer from the fuel outward to the container while the fuel is expanding to fill the intermediate space.

A typical fuel element 10 comprising a metallic fuel 12 housed in a stainless steel container 14 for service in a liquid metal cooled nuclear reactor has cylindrical fuel units approximately 0.19 inches in diameter within a sealed tubular container having wall thickness of about 20 mils and about 0.26 inches in outside diameter.

As noted above, low melting point metal alloys form at the interface between uranium-zirconium and uranium-plutonium-zirconium metal alloy fuels and stainless steel fuel container materials such as the HT9 and D9 commercial alloys. These low melting point alloys can seriously degrade fuel container performance during high temperature reactor transient events whereby prudence requires the establishment of conservative reactor operating and safety limits.

Moreover, although it has been found that zirconium as an additive to the uranium and uranium-plutonium metal alloy fuels produces higher melting point fuel alloys, it has also been found that during irradiation in their fission reaction, the uniform alloys of these fuels restructure to form areas of low zirconium content within the fuel mass or body. Composition measurements, for example, of restructured fuel material from several different sample locations is shown in the following Table 2 for an initial uniform alloy of 71 weight percent uranium, 19 weight percent plutonium and 10 weight percent zirconium following a 2.0 a/o burnup.

TABLE 2

| COMPOSITION OF THE INTERMEDIATE ZONES OF U-PU-ZR FUEL ALLOY AT 2.9% PEAK BURNUP | |
|---|---|
| Sample Location | Normalized Composition (wt. %) |
| A | 76.0 U - 21.4 Pu - 2.5 Zr |
| B | 77.3 U - 20.2 Pu - 2.5 Zr |
| C | 78.0 U - 19.9 Pu - 2.1 Zr |
| D | 78.1 U - 21.5 Pu - 0.4 Zr |
| E | 72.9 U - 22.7 Pu - 4.4 Zr |

Sample D portion of the fuel alloy containing about 0.4 weight percent zirconium would have a melting point of about 1238 degrees F. (670 degrees C.). Restructuring of the fuel alloy due to irradiation resulting from fission thereby significantly diminishes the effect of the zirconium additive.

Fuel container materials are selected for their resistance to interaction with uranium-plutonium-zirconium and uranium-zirconium alloy fuels. Nevertheless diffusion couple studies and irradiation evaluations have demonstrated that diffusion of plutonium, uranium and fission products to the container material occurs without a corresponding diffusion of enough zirconium to maintain the desired high melting point alloy composition at the interface of the fuel and the container.

Irradiation studies demonstrate that the HT9 composition stainless steel containers in contact with 71 weight percent uranium, 19 weight percent plutonium and 10 weight percent zirconium metal alloy fuel resulted in a 7 to 10 micron deep reaction zone into the steel alloy at 2.9 a/o burnup, which was enriched in plutonium and radiation product cesium. Both plutonium and cesium form low melting point alloys with stainless steel alloy constituents as illustrated in the following Table 3.

TABLE 3

| FUEL ALLOY MELTING POINTS AND COMPOSITION | | |
|---|---|---|
| ALLOY | MELTING POINT C. DEGREES | COMPOSITION WEIGHT PERCENT |
| Pu—Fe | 410 | 2.5 Fe |
| Pu—Ni | 475 | 4 Ni |
| Ce—Ni | 477 | 8 Ni |
| Ce—Fe | 592 | 4 Fe |
| Pu—U | 610 | 12 U |
| Pu—Mo | 613 | 0.5 Mo |
| Pu—Cr | 615 | 0.5 Cr |
| Pu—Ce | 625 | 12 Ce |
| Pu | 640 | — |
| Pu—Zr | >640 | * |
| U—Fe | 725 | 11 Fe |
| U—Ni | 740 | 11 Ni |
| Zr—Ce | 750 | 3 Zr |

TABLE 3-continued

FUEL ALLOY MELTING POINTS AND COMPOSITION

| ALLOY | MELTING POINT C. DEGREES | COMPOSITION WEIGHT PERCENT |
|---|---|---|
| U—Cr | 860 | 5 Cr |
| U—26P—2Zr | 913 | — |
| Zr—Fe | 934 | 16 Fe |
| Zr—Fe | 961 | 17 Ni |
| U | 1134 | — |
| U—Zr | >1134 | * |
| Zr—Cr | 1300 | 18 Cr |

*Form solid solution, Pu and U have lowest melting points in the system.

In accordance with this invention, an expendable body of alloying metal, such as zirconium, having the property of raising the melting temperature of the metallic fuel is interfaced between the metal alloy fuel and the stainless steel container housing the fuel. This interposed body of alloying metal within the fuel element protects the stainless steel fuel container from the deleterious effects of low melting point alloys resulting from irradiation by means of increasing the melting point of such alloys through its availability for raising the melting point of alloys formed at the critical fuel/container interface.

Alloying metals which have the property of increasing the melting temperature of metallic fuels comprise zirconium, titanium, niobium, molybdenum, and the like. Zirconium is a preferred alloying metal for the practice of this invention.

A fundamental aspect of this invention is that the expendable body of alloying metal be positioned within the fuel element to assure that the metal alloy fuel, or components thereof, interact with the interposed body of expendable alloying metal and not the stainless steel of the fuel container. A melting of plutonium and/or uranium of the fuel, and/or any fission produced materials or alloys at the interface of the fuel with the imposed body of expendable alloying metal causes a dissolution of the alloying metal which in turn raises the melting point of the resulting combined materials or alloy whereby they become solidified. This effect of the introduction of zirconium, for example, at the critical interface location is demonstrated by phase diagrams for uranium-zirconium and plutonium-zirconium. See for instance pages 1250 to 1253 of *Constitution Of Binary Alloying* by Max Edition, McGraw-Hill Book Co., 1958 and pages 764 to 767 of *Constitution Of Binary Alloys, First Supplement*, by Rodney P. Elliot, McGraw-Hill Book Co., 1965, respectively.

Figure 2:
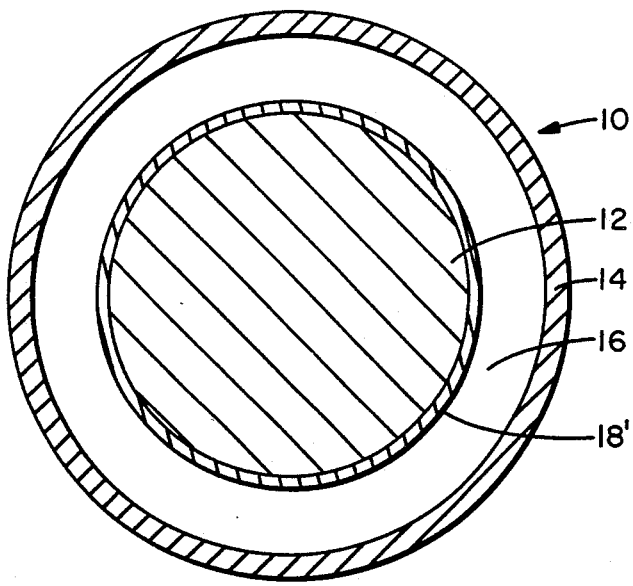
FIG. 2 of the drawings is an enlarged cross-sectional view of one embodiment of a nuclear fuel element of this invention.

The imposed expendable body of zirconium metal can be applied intermediate the metal alloy fuel and the fuel container in any one of several designs or forms. For example, as illustrated in FIG. 2 of the drawings, the expendable body of zirconium metal can be installed in space 16 in the form of a cladding layer 18' of zirconium over the outer perimeter surface of the fuel 12. This embodiment however is the least desirable due to the extensive swelling of the fuel undergoing fission, whereby the covering cladding layer 18' may be breached leaving unprotected areas over the outer peripheral surface of the bloated fuel unit.

Figure 3:
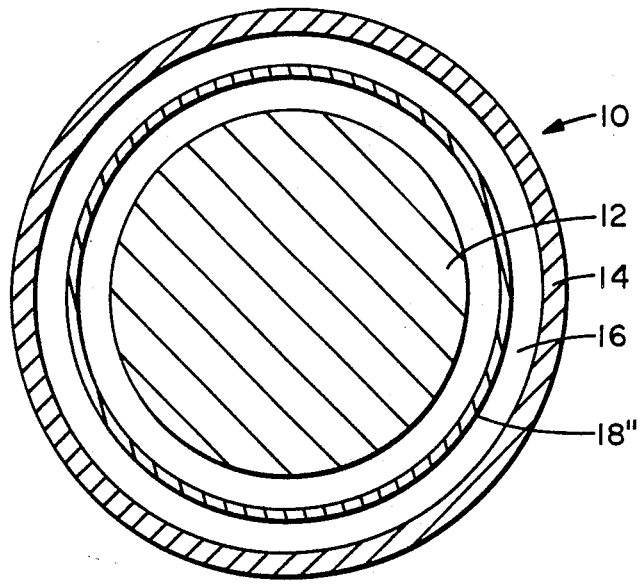
FIG. 3 of the drawings is an enlarged cross-sectional view of a different embodiment of a nuclear fuel element of this invention.

Another embodiment of this invention is illustrated in FIG. 3, comprising the introduction of a circular sleeve 18" such as a hollow cylinder of zirconium metal, into the space 16 intermediate the fuel 12 and fuel container 14. The sleeve 18" can be formed of rolled zirconium metal foil or a rigid tubular section which surrounds the fuel 12. Such an embodiment can be designed to accommodate the inherent fuel swelling and thereby maintain its effectiveness throughout long services.

Figure 4:
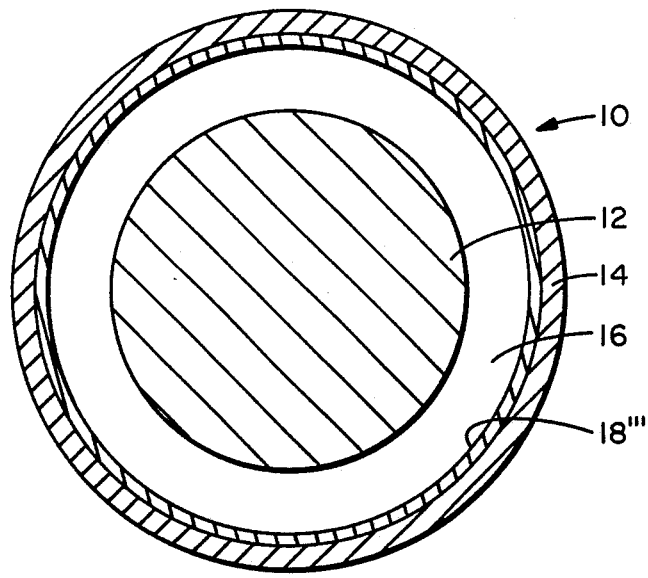
FIG. 4 of the drawings is an enlarged cross-sectional view of another embodiment of a nuclear fuel element of this invention.

A preferred embodiment for the practice of this invention is illustrated in FIG. 4 of the drawings. In this embodiment the expendable body of zirconium metal is interposed between the fuel 12 and fuel container 14 in space 16 by applying the zirconium metal as a cladding layer 18''' over the inner surface of the stainless steel fuel container 14. Thus, with the inherent swelling of the fuel 12, the expendable body of zirconium metal 18''' can not be breached or dislodged from intermediate the fuel 12 and fuel container 14 whereby it is available to perform its essential alloying function.

The thickness and to a degree the metal composition of the expendable body of zirconium 18 of this invention can be varied in the effective practice of this invention. Typically the thickness of the expendable body of zirconium 18 imposed between the fuel 12 and container 14 should be at least about 2 mils, and preferably approximately 5 mils thick. A suitable range of thickness for the expendable zirconium metal 18 comprises about 2 to about 10 mils since great thickness would not serve to better protect the fuel container 14 and would occupy more of the necessary void space 16 provided for fuel expansion and thereby increase physical stress upon the container 14.

An example of the mechanism of this invention is as follows. A 0.003 inch thick layer of plutonium would have the melting point raised from 1184 degrees F. (640 degrees C.) up to 1616 degrees F. (880 degrees C.) after dissolving a zirconium metal layer 0.001 inch thick and forming a 90 weight percent plutonium/10 weight percent zirconium alloy. Protection from formation of low melting point alloys is also provided through solid state diffusion of zirconium metal into the uranium/plutonium/zirconium fuel alloys from the expendable zirconium body.

The fuel containers/expendable zirconium metal interface is characterized by constituents which form relatively high melting point binary alloys. Zirconium and iron, a stainless steel alloy ingredient, form a eutectic degrees F. (934 degrees C.) and contains about 16 weight percent iron. This would be the lowest melting point binary alloy formed with HT9 to D9 stainless steel fuel container constituents, and is well above any temperature projected for power generating, liquid metal cooled nuclear reactor operation or safety scenarios.

What is claimed is:

1. A method of inhibiting an interaction between a metal alloy fissionable fuel for a nuclear reactor and a stainless steel container for the fuel which results in low temperature melting eutectic reaction products of components from the metal alloy fuel and stainless steel, consisting essentially of the improvement of providing an expandable body of at least one alloying metal for the metal alloy fissionable fuel selected from the group consisting of zirconium, titanium, niobium and molybdenum at least about 2 mils thick interposed into a space between a metal alloy fuel comprising metallic uranium and plutonium and the stainless steel container housing the metal alloy fuel therein.

2. A method of inhibiting an interaction between a metal alloy fissionable fuel and a stainless steel container of claim 1, consisting essentially of a cladding of expendable alloying metal on the outer peripheral surface of the metal alloy fuel.

3. The method of inhibiting an interaction between a metal alloy fissionable fuel and a stainless steel container of claim 1, consisting essentially of providing a sleeve of expendable alloying metal interposed into a space between the metal alloy fuel and the stainless steel container.

4. The method of inhibiting an interaction between a metal alloy fissionable fuel and a stainless steel container of claim 1, consisting essentially of providing a cladding of expendable alloying metal selected from the group consisting of zirconium, titanium, niobium and molybdenum on the inside surface of the stainless steel container housing the metal alloy fuel therein.

5. A method of inhibiting an interaction between a metal alloy fissionable fuel for a nuclear reactor comprising uranium and plutonium and a stainless steel container for the fuel which results in low temperature melting eutectic reaction products of components from the metal alloy fuel and stainless steel, consisting essentially of the improvement of providing an expendable body of at least one alloying metal for the metal alloy fissionable fuel of about 2 to 10 mils thick interposed into a space between the metal alloy fuel and the stainless steel container housing the fuel therein.

6. The method of inhibiting an interaction between a metal alloy fissionable fuel and a stainless steel container of claim 5, consisting essentially of a cladding of expendable alloying metal approximately 5 mils thick on the inside surface of the stainless steel container housing the metal alloy fuel therein.

7. A fuel element for a nuclear reactor consisting essentially of an elongated body of a metal alloy fissionable fuel comprising uranium and plutonium metal housed within a sealed elongated container of stainless steel, sail elongated body of fuel initially being of a smaller cross-sectional dimension than the interior cross-section of the stainless steel container thereby providing an initial intermediate space between the body of metal alloy fuel and the container housing same, and an expendable body of zirconium metal for alloying with the metal alloy fissionable fuel interposed into the space between the metal alloy fuel and the stainless steel container housing same.

8. The fuel element for a nuclear reactor of claim 4, wherein the expendable body of zirconium metal consists essentially of a cladding on the outer perimeter surface of the metal alloy fuel.

9. The fuel element for a nuclear reactor of claim 7, wherein the expendable body of zirconium metal consists essentially of a sleeve of expendable zirconium metal interposed into the space between the metal alloy fuel and the stainless steel container.

10. The fuel element for a nuclear reactor of claim 7, wherein the expendable body of zirconium metal consists essentially of a cladding on the inside surface of the stainless steel container housing the metal alloy fuel.

11. A fuel element for a nuclear reactor consisting essentially of an elongated body of a metal alloy fissionable fuel comprising uranium and plutonium metal housed within a sealed elongated container of stainless steel, said elongated body of metal fuel initially being of smaller cross-sectional dimension then the interior cross-section of the elongated stainless steel container thereby providing an initial intermediate space between the body of metal fuel and the stainless steel container housing the fuel, and an expendable body of zirconium metal for alloying with the metal alloy fissionable fuel of at least 2 mils thick interposed into the space between the body of metal alloy fuel and the stainless steel container housing the metal alloy fuel.

12. The fuel element for a nuclear reactor of claim 11, wherein the expendable body of zirconium metal consists essentially of a cladding of zirconium metal on the outer perimeter surface of the metal alloy fuel.

13. The fuel element for a nuclear reactor of claim 11, wherein the expendable body of zirconium metal consists essentially of a sleeve of expendable zirconium metal interposed into the space between the metal alloy fuel and the stainless steel container housing the fuel.

14. The fuel element for a nuclear reactor of claim 11, wherein the expendable body of zirconium metal consists essentially of a cladding on the inside surface of the stainless steel container housing the metal alloy fuel.

15. A fuel element for a nuclear reactor consisting essentially of an elongated body of metal alloy fissionable fuel comprising uranium, plutonium and zirconium metal housed within a sealed elongated container of stainless steel, said elongated body of metal fuel initially being of a smaller cross-sectional dimension than the interior cross-section of the elongated stainless steel container thereby providing an initial intermediate space between the body of metal fuel and the stainless steel container housing the fuel, and an expendable body of zirconium metal for alloying with the metal alloy fissionable fuel of about 2 to about 10 mils thick interposed into the space between the body of metal alloy fuel and the stainless steel container housing the metal alloy fuel.

16. The fuel element for a nuclear reactor of claim 15, wherein the expendable body of zirconium metal consists essentially of a cladding of approximately 5 mils thick on the inside surface of the stainless steel container housing the metal alloy fuel.

* * * * *